United States Patent [19]

Asano et al.

[11] Patent Number: 5,091,267

[45] Date of Patent: Feb. 25, 1992

[54] MAGNETO-OPTICAL RECORDING MEDIUM AND PROCESS FOR PRODUCTION OF THE SAME

[75] Inventors: Mutsumi Asano; Kiyoshi Kasai; Hidehiko Misaki, all of Kanagawa, Japan

[73] Assignee: Tosoh Corporation, Yamaguchi, Japan

[21] Appl. No.: 495,952

[22] Filed: Mar. 20, 1990

[30] Foreign Application Priority Data

Mar. 20, 1989 [JP] Japan .................................. 1-66382

[51] Int. Cl.⁵ .............................................. G11B 5/66
[52] U.S. Cl. ................................... 428/694; 428/698; 428/900; 204/192.1
[58] Field of Search ................ 428/694, 900, 698, 704

[56] References Cited

U.S. PATENT DOCUMENTS 4,661,420 4/1987 Nakamura et al. ................ 428/694

FOREIGN PATENT DOCUMENTS 3702480 8/1988 Fed. Rep. of Germany .

Primary Examiner—Merrell C. Cashion, Jr.
Assistant Examiner—Robert J. Follett
Attorney, Agent, or Firm—Sughrue, Mion, Zinn, Macpeak & Seas

[57] ABSTRACT

A magneto-optical recording medium and process for production of the same are disclosed, the magneto-recording medium comprising a substrate having thereon a magneto-optical recording film and at least one coating film provided on a light incident side and/or an opposite side thereto, of said magneto-optical recording film for protection of said magneto-optical recording film and/or Kerr effect enhancement, wherein said coating film contains silicon, nitrogen, and hydrogen as constituent elements. The magneto-optical recording medium has excellent reliability, excellent read-out performance properties as well as excellent recording sensitivity while exhibiting high magneto-optical effects and freedom from corrosion.

4 Claims, 4 Drawing Sheets

MAGNETO-OPTICAL RECORDING MEDIUM AND PROCESS FOR PRODUCTION OF THE SAME

FIELD OF THE INVENTION

This invention relates to a magneto-optical recording medium and a process for the production of the same. More particularly, it relates to a magneto-optical recording medium comprising a substrate having thereon a magneto-optical recording magnetic film and a coating film.

BACKGROUND OF THE INVENTION

Photo recording media which are conventionally known as rewritable photo recording media capable of writing and erasing include a phase transition type, a photochromic type, and a magneto-optical type. Of these rewritable photo recording media, the magneto-optical type recording media are characterized by high recording speed and excellent resistance to repeated use.

Conventional magneto-optical recording media comprise a substrate having thereon a magneto-optical recording magnetic film (hereinafter simply referred to as a magnetic film) comprising a rare earth metal-transition metal film (hereinafter referred to as an RE-TM film) or an MnBi type film, and those using an RE-TM film are excellent in general characteristics. However, these films are inferior in corrosion resistance and liable to undergo deterioration arising from corrosion, such as change of coercive force, reduction in angle of Kerr rotation, and pitting, which leads to reduction in C/N (carrier to noise) ratio and increase in error ratio when used as a recording medium.

In order to solve this problem, it is known to provide a coating film on one or both sides of the magnetic film to improve corrosion resistance.

Where a coating film is formed on the light incident side of the magnetic film, it also brings about enhancement of Kerr effect, i.e., an increase of Kerr rotation angle, of the magnetic film, but the coating film must have a large refractive index before the Kerr effect enhancement can be obtained.

On the other hand, it is desired that the coating film formed on a magnetic film and/or a substrate made of a synthetic resin, glass, etc. should be chemically stable and capable of blocking oxygen or moisture, and exhibit good affinity for the substrate or magnetic film. When, in particular, in using a synthetic resin, e.g., polycarbonate and acrylic resins, as a substrate, the coating film is keenly demanded to be impermeable to oxygen, moisture, etc. present in the substrate or permeating through the substrate while exhibiting good affinity for the substrate and magnetic film. Where a protective coating film is provided on the light incident side of the magnetic film, it is also required to have transparency enough for incident light to sufficiently reach the magnetic film as well as a high refractive index for taking advantage of the above-described Kerr effect enhancement function.

In addition, it is also demanded for magneto-optical recording media to work at a higher speed in order to increase a speed of information transfer.

Conventionally reported coating films meeting either one or both of the purpose of magnetic film protection and the purpose of Kerr effect enhancement include films of oxides, e.g., $SiO_2$ and $Al_2O_3$, and films of nitrides, e.g., AlN and $Si_3N_4$. It has been point out, however, that magneto-optical recording media having such a coating film on a magnetic film have the following disadvantages That is, coating films of an oxide, e.g., $SiO_2$ or $Al_2O_3$, release oxygen readily oxidizing the rare earth metal to cause deterioration of RE-TM film characteristics. On the other hand, nitrides, e.g., AlN and $Si_3N_4$, contain no oxygen and, hence, have satisfactory protective performance without causing oxidation of the magnetic film. However, coating films of AlN lack stability against moisture and those using SiN exhibit poor adhesion to a substrate and are liable to undergo peeling off.

Thus, under the present situation, a coating film satisfying various demands stated above has not yet been developed. Moreover, recording media using the conventional coating films have insufficient sensitivity in working at a high speed.

SUMMARY OF THE INVENTION

An object of this invention is to provide a magneto-optical recording medium having a high Kerr effect and excellent writing sensitivity without being accompanied by corrosion of a magnetic film.

Another object of this invention is to provide a process for producing the above-described magneto-optical recording medium.

The present invention provides a magneto-optical recording medium comprising a substrate having thereon a magneto-optical recording film and at least one coating film provided on a light incident side and/or an opposite side thereto, of the recording film, said coating film containing silicon, nitrogen, and hydrogen as constituent elements.

The present invention also provides a process for producing such a magneto-optical recording medium.

DETAILED DESCRIPTION OF THE INVENTION

Figure 1:
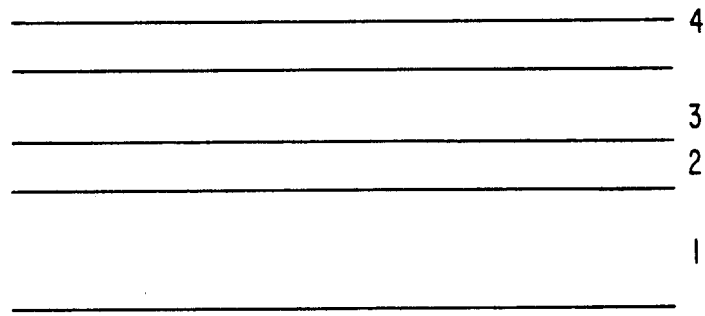
FIGS. 1 and 2 each illustrates a schematic cross section of the magneto-optical recording medium according to the present invention.

Magnetic films which can be used in the magneto-optical recording media according to the present invention include RE-TM films and Mn-Bi-based films. Included in the RE-TM films are Tb-Fe-Co-based films, Gd-Fe-Co-based films, Gd-Tb-Fe-Co-based films, Tb-Co-based films, Tb-Dy-Fe-Co-based films, Nd-Dy-Fe-Co-based films, and Dy-Fe-Co-based films.

The present invention is also applicable to other recording media using recording materials which ar susceptible to deterioration due to monomers or moisture in synthetic resins or atmospheric moisture, for example, elements of oxygen family for WORM (write once read many) recording media. It is also possible to make use of the coating film of the present invention for purposes other than protection of a magnetic film. For example, a coating film having a reflection preventive structure may be provided for improvement of sensitivity to obtain a recording medium excellent in recording sensitivity.

Suitable substrates which can be used in the present invention include transparent substrates made of polycarbonate, glass, epoxy resins, etc. The recording media of the present invention may have an arbitrary shape and include cards, tapes, sheets, drums as well as general disks.

The magneto-optical recording media of this invention are applicable to any of an embodiment in which a light is incident from the substrate side and an embodiment in which a light is incident from an opposite side to the substrate. In the following description, however, this invention is explained in detail with reference to the former embodiment.

A coating film containing Si, N, and H according to the present invention is provided between a magnetic film and a substrate for the purpose of obtaining at least one of Kerr effect enhancement and protection of the magnetic recording layer from corrosion, etc., or such a coating film is provided on the opposite side (hereinafter simply referred to as "back" or "back side") of the magnetic film to the substrate for the purpose of protecting the magnetic film from corrosion, etc. For example, in cases where a magnetic film is an RE-TM film or an Mn-Bi-based film, the coating film provided between the magnetic film and the substrate produces both of the two effects stated above. The effects of magnetic film protection and/or Kerr effect enhancement can be enjoyed irrespective of whether the coating film containing Si, N, and H is provided on both sides of the magnetic film or on only one side of the magnetic film. In the latter case, the other side of the magnetic film may have no coating film or may have other coating film.

When improvement in recording sensitivity is aimed at, the coating film containing Si, N, and H is provided between a magnetic film and a substrate and/or on the back side of the magnetic film.

The essential feature of the present invention resides in that the coating film is substantially comprised of constituent elements of Si, N, and H. Particularly, the abovedescribed coating film having absorptions in the infrared region at $850\pm50$ cm$^{-1}$, $2250\pm50$ cm$^{-1}$ and $3350\pm50$ cm$^{-1}$ shows better transparency, affinity with the substrate, and thermal conductivity. The reasons are not always clear but are considered as follows. That is, in the coating film, free bonds of Si are bonded to H and free bonds of N are bonded to H to thereby improve transparency, and the existence of H improves affinity for the substrate.

Further, in the coating film containing Si, N, and H, since Si and N atoms are partly bonded to H to form a network structure having discontinuity in parts, the film has reduced thermal conductivity as compared with $Si_3N_4$. Thus, magneto-optical recording media containing such coating films exhibit excellent recording sensitivity.

The coating film containing Si, N, and H according to this invention preferably contains from $1.0\times10^{21}$ to $1.0\times10^{23}$, more preferably from $5.0\times10^{21}$ to $5.0\times10^{22}$, hydrogen atoms per cm$^3$. If the hydrogen atom content is too high, the coating film tends to be porous, likely leading to breakage of the film, generation of reading errors, and a reduction of the C/N ratio. On the other hand, if the hydrogen atom content is too low, the adhesion of the coating film to the substrate is likely deteriorated, and the sensitivity of the medium is likely reduced.

Further, the coating film containing Si, N, and H according to this invention preferably has a nitrogen content of at least 10 atomic %, more preferably from 10 to 60 atomic %, based on the sum of the consitutent elements other than hydrogen. If the nitrogen content is too high, the absorption of light increases, whereby the Kerr effect is likely reduced, while if the nitrogen content is too low, the preparation is difficult.

Thickness of the coating film containing Si, N, and H is not particularly critical, but the coating film should have a refractive index of at least 1.9. In the cases where the coating film is interposed between a substrate and a magnetic film, the coating film preferably has a thickness between 50 nm and 150 nm in order to effectively take advantage of the Kerr effect enhancement function In the cases where the coating film is used for back protection of a magnetic film, too a thin film has a reduced protective effect, and too a thick film requires a longer time for film formation. Accordingly, a suitable thickness in these cases is selected from a range of, for example, from 30 to 200 nm.

In producing the magneto-optical recording medium of the present invention, methods for forming the coating film include sputtering using metallic silicon as a target and a mixed gas of an inert gas, nitrogen gas, and hydrogen gas; sputtering using metallic silicon as a target and a mixed gas of an inert gas and ammonia gas or a mixed gas of an inert gas, ammonia gas, and hydrogen gas; and sputtering using metallic silicon as a target and a mixed gas of an inert gas, nitrogen gas, and ammonia gas. The inert gas which can be used is preferably argon gas.

The coating film may also be produced by CVD (chemical vapor deposition) using a silane gas, nitrogen gas, hydogen gas, etc. However, the above-described sputtering method is preferred considering that a magnetic film of magneto-optical recording media is generally formed by sputtering and that a rise of temperature of a substrate made of, in many cases, a synthetic resin is desirably minimized.

Taking it into consideration that the sputtering temperature should be kept low in the case of using a resin substrate and also a temperature rise should desirably be avoided even when heating is conducted in the case of using a glass substrate, etc., it is preferable to employ a magnetron apparatus for carrying out sputtering, by which the substrate temperature can easily be controlled and a high rate of film formation can be achieved. Preliminary evacuation preceding sputtering is preferably effected to a degree of vacuum as high as possible in order to remove influences of any residual gases.

Metallic silicon to be used as a target may contain up to several percents by weight of impurities without giving any adverse influences on the performance of the formed coating film. The total sputtering gas pressure is preferably from 0.15 to 1 Pa. A proportion of ammonia gas, if used, in the mixed gas preferably ranges from 5 to 40% by volume. The contents of hydrogen and nitrogen in the coating film can be controlled by controlling the concentrations of the respective gases in the mixed gas.

Thus, there is provided a coating film exhibiting strong adhesion to a magnetic film or a substrate with good mass-productivity.

Other layers of the magneto-optical recording medium, such as a magnetic recording layer and other coating film, can be formed by a sputtering method.

The magneto-optical recording media according to the present invention having the above-described specific coating film or films are excellent in reliability and recording sensitivity.

The present invention is illustrated below by referring to accompanying drawings, but it should be understood that the present invention is not deemed to be limited to these drawings.

FIG. 1 shows a cross section of one of the embodiments of the magneto-optical recording medium according to the present invention Numeral 1 indicates a transparent substrate made of glass, polymethyl methacrylate, polycarbonate, etc. on which grooves (not shown) are formed for tracking guidance. Numeral 2 is a first coating film interposed between substrate 1 and magnetic film 3, which has a function of Kerr effect enhancement combined with a protective function. Magnetic film 3 is, for example, a Tb-Fe-Co-based RE-TM film. Numeral 4 indicates a second (back side) coating film having a protective function.

At least one of first coating film 1 and second coating film 4 constitutes a coating film containing Si, H, and N to thereby provide the magneto-optical recording medium of the present invention.

In this embodiment, the thickness of magnetic film 3 would be in the range of from 30 to 120 nm. When a coating film containing Si, H and N is used as first coating film 2, the thickness of the coating film would be in the range of from 50 to 120 nm, while when a coating film containing Si, H and N is used as second coating film 4, the thickness of the coating film would be in the range of from 70 to 110 nm.

Figure 2:
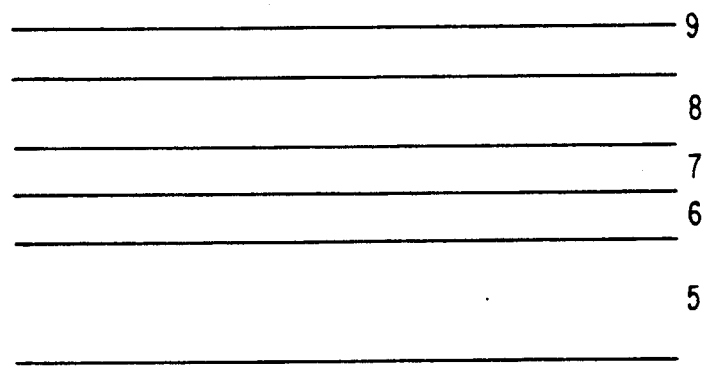

FIG. 2 is a cross section of another embodiment of the magneto-optical recording medium of the present invention. In this embodiment, the coating film between substrate 5 and magnetic film 8 is composed of two layers 6 and 7. For example, layer 6 may be an $SiO_2$ film for a protective purpose, and the thickness thereof would be in the range of from 10 to 100 nm, while layer 7 may be a ZnS film for Kerr effect enhancement, and the thickness thereof would be in the range of from 50 to 120 nm. Numerals 8 and 9 indicate a magnetic film and a back side coating film, respectively.

Further, the magneto-optical recording medium of the present invention is applicable to a reflective type medium. The reflective type medium has a reflective layer other than the coating film above the back side of the recording film. In this embodiment, the thickness of the magnetic film would be in the range of from 10 to 50 nm, and when a coating film containing Si, N and H is provided on a light incident side of the magnetic film, the thickness of the coating film would be in the range of from 70 to 150 nm, while a coating film containing Si, N and H is provided on an opposite side of a light incident side of the magnetic film, the thickness of the coating film would be in the range of from 10 to 80 nm. The reflective layer should be made of a reflective material such as aluminum, titanium, chromium or other reflective metals or alloys thereof, and the thickness of the reflective layer would be in the range of from 20 to 100 nm.

The present invention will be described below in greater detail by way of Examples, but it should be understood that the present invention is not deemed to be limited thereto.

EXAMPLES 1 TO 9

A coating film having a thickness in the range of from 110 to 140 nm, a characteristic element constituting the magneto-optical recording medium of the present invention, was formed on a quartz glass substrate or an N-type silicon wafer, and characteristics of the coating film were evaluated.

Formation of the coating film was carried out by means of a dc-magnetron sputtering apparatus having a radio frequency power source (frequency: 13.56 MHz) and a direct current power source ("CFS-4ES" manufactured by Tokuda Seisakusho). Metallic silicon was set as a target. After the sputtering chamber was preliminarily evacuated to a degree of vacuum of $2 \times 10^{-4}$ Pa or less, the substrate was revolved at 20 rpm without being heated, and radio frequency sputtering was performed at an electrical power of 300 W while introducing a mixed gas having a composition shown in Table 1 below.

The refractive index of the protective film formed on the silicon wafer as measured with an ellipsometer and the transmittance (at a wavelength of 830 nm) of the coating film formed on the quartz glass substrate as measured with a spectrophotometer are also shown in Table 1.

TABLE 1

| Example No. | Gas Flow Rate (sccm) | | | | Transmittance (%) | Refractive Index |
|---|---|---|---|---|---|---|
| | Ar | $NH_3$ | $N_2$ | $H_2$ | | |
| 1 | 20 | 0 | 3 | 2 | 91 | 2.2 |
| 2 | 20 | 0 | 3 | 10 | 93 | 2.0 |
| 3 | 20 | 0 | 4 | 2 | 93 | 2.1 |
| 4 | 20 | 0 | 4 | 10 | 93 | 1.9 |
| 5 | 20 | 2 | 0 | 0 | 87 | 2.4 |
| 6 | 20 | 3 | 0 | 0 | 91 | 2.1 |
| 7 | 20 | 4 | 0 | 0 | 93 | 2.0 |
| 8 | 20 | 2 | 0 | 5 | 92 | 2.1 |
| 9 | 20 | 1 | 3 | 0 | 92 | 2.0 |

It can be seen from the reuslts of Table 1 that the coating film according to the present invention has not only sufficient transparency but a high refractive index reaching 1.9 or higher, from which satisfactory Kerr effect enhancement can be expected.

Further, the infrared absorption spectrum of each of the coating films formed on the silicon wafer was determined with a Fourier transform infrared spectrophotometer ("JIR-1000" manufactured by JEOL Ltd.). As a result, absorptions at $3350 \pm 50$ cm$^{-1}$ and $2200 \pm 50$ cm$^{-1}$, which are assigned to N-H bond and Si-H bond, respectively, were found, and presence of H was thus confirmed as well as other absorption at $850 \pm 50$ cm$^{-1}$, which is assigned to Si-N bond, was found. The H content (number of H atoms per cm$^3$) was determined by analysis of the infrared absorption spectrum of the coating films according to the method reported in *Journal of Applied Physics*, Vol. 49, p. 2473 (1978). The results obtained are shown in Table 2 below. In addition, the composition of the coating film was determined by electron probe microanalysis (EPMA). The results obtained are also shown in Table 2.

TABLE 2

| Example No. | H Content, (number/cm$^3$) | EPMA Composition* | |
|---|---|---|---|
| | | Si (at. %) | N (at. %) |
| 1 | $1.0 \times 10^{22}$ | 77 | 23 |
| 2 | $2.3 \times 10^{22}$ | 75 | 25 |
| 3 | $8.4 \times 10^{21}$ | 47 | 53 |
| 4 | $2.8 \times 10^{22}$ | 46 | 54 |
| 5 | $8.2 \times 10^{21}$ | 88 | 12 |
| 6 | $1.5 \times 10^{22}$ | 57 | 43 |
| 7 | $2.5 \times 10^{22}$ | 44 | 56 |
| 8 | $2.4 \times 10^{22}$ | 78 | 22 |
| 9 | $8.6 \times 10^{21}$ | 48 | 52 |

Note:
*H atom is excluded.

COMPARATIVE EXAMPLES 1 TO 2

A comparative coating film was formed on a quartz glass substrate or an N-type silicon wafer substrate as follows.

In the same manner as in Examples 1 to 8, formation of the coating film was carried out by means of a diode magnetron sputtering apparatus "CFS-4ES" having a radio frequency power source (frequency: 13.56 MHz) and a direct current power source. Metallic silicon was set as a target. After the sputtering chamber was preliminarily evacuated to a degree of vacuum of $2 \times 10^{-4}$ Pa or less, the substrate was revolved at 20 rpm without being heated, and radio frequency sputtering was performed at an electrical power of 300 W while introducing a mixed gas having a composition shown in Table 3 below.

The refractive index, transmittance (at a wavelength of 830 nm) and composition of the thus formed coating film were determined in the same manner as in Examples 1 to 8, and the results obtained are shown in Table 3.

Further, the infrared absorption spectrum of each coating film formed on the silicon wafer was determined by means of a Fourier transform spectrophotometer. As a result, it was revealed that these coating films contained no hydrogen.

TABLE 3

| | Comparative Example 1 | Comparative Example 2 |
|---|---|---|
| Gas Flow Rate (sccm): | | |
| Ar | 20 | 20 |
| N$_2$ | 4 | 5 |
| Transmittance (%) | 91 | 92 |
| Refractive Index | 2.1 | 2.0 |
| EPMA Composition* | | |
| Si (at. %) | 45.2 | 43.9 |
| N (at. %) | 54.8 | 56.1 |

Note:
*H atom is excluded.

EXAMPLES 10 TO 13

A magneto-optical recording medium having the structure of FIG. 1 was produced, in which 75 nm thick magnetic film 3 having a composition of Tb$_{24}$Fe$_{64.5}$Co$_{11.5}$ (at.%) was formed on a polycarbonate disk substrate (diameter: 13 cm; thickness: 1 2 mm) having a guiding groove (pitch: 1.6 μm; groove width: 0.6 μm) with a coating film containing Si, N, and H being formed on both sides of magnetic film 3.

The production was carried out using the same sputtering apparatus as used in the foregoing Examples. The coating films were formed by radio frequency sputtering, and the magnetic film was formed by direct current sputtering using TbFeCo as a target. The conditions for coating film formation in Examples 10, 11, 12, and 13 were the same as in Examples 3, 4, 7, and 8, respectively. The thickness of coating film 2 and that of back side protective film 4 were fixed at 85 nm and 100 nm, respectively.

COMPARATIVE EXAMPLES 3 TO 5

For comparison, a magneto-optical recording medium having the structure of FIG. 1 was produced, in which 75 nm thick magnetic film 3 having a composition of Tb$_{24}$Fe$_{64.5}$Co$_{11.5}$ at.%) was formed on a polycarbonate disk substrate (diameter: 13 cm; thickness: 1.2 mm) having a guiding groove (pitch: 1.6 μm; groove width: 0.6 μm) with a coating film being formed on one or both sides of magnetic film 3 as described below.

The production was carried out using the same sputtering apparatus as used in the foregoing Examples. The coating film was formed by radio frequency sputtering, and the magnetic film was formed by direct current sputtering using TbFeCo as a target. The conditions for coating film formation were the same as in Comparative Examples 1 and 2. The conditions of Comaprative Examples 3 and 4 corresponded to those of Comparative Examples 1 and 2. In Comaprative Examples 3 and 4, the thickness of coating film 2 and that of back side protective film 4 were fixed at 85 nm and 100 nm, respectively. In Comparative Example 5, protective film 2 was not formed, and back side protective film 4 was formed to a thickness of 100 μm under the same conditions as in Comparative Example 2.

Evaluation Test 1

Each of the recording media of Examples 10 to 13 and Comparative Examples 3 and 4 was evaluated for dependence of recording power on linear velocity by using a drive apparatus as follows.

The drive apparatus used had a wavelength of 830 nm and a lens having an NA of 0.5. Determinations were carried out with a linear velocity and a recording frequency being varied so as to obtain a recording bit length of 1.4 μm. The recording power was varied within a range of from 3 mW to 10 mW, and the optimum recording power at which the second harmonic became the minimum was obtained. Other measurement conditions were 500 Oe in external magnetic field; 50% in duty ratio; and 0.8 mW in reading power.

Figure 3:
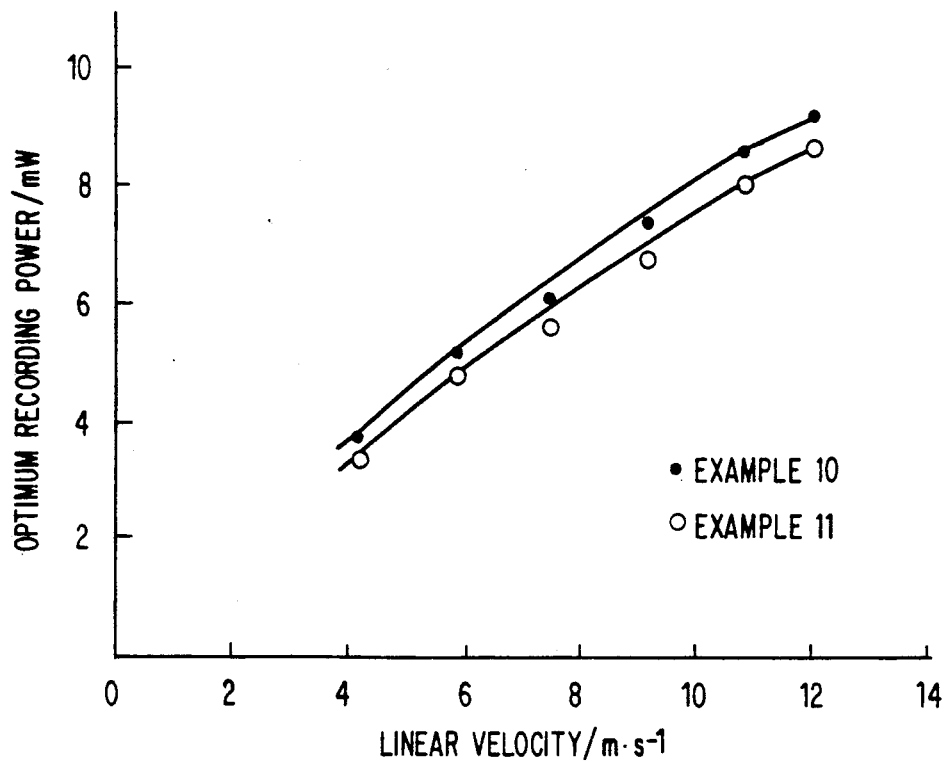
FIG. 3 is a graph depicting a relationship between linear velocity and optimum recording power in the magneto-optical recording media obtained in Examples 10 and 11.
Figure 4:
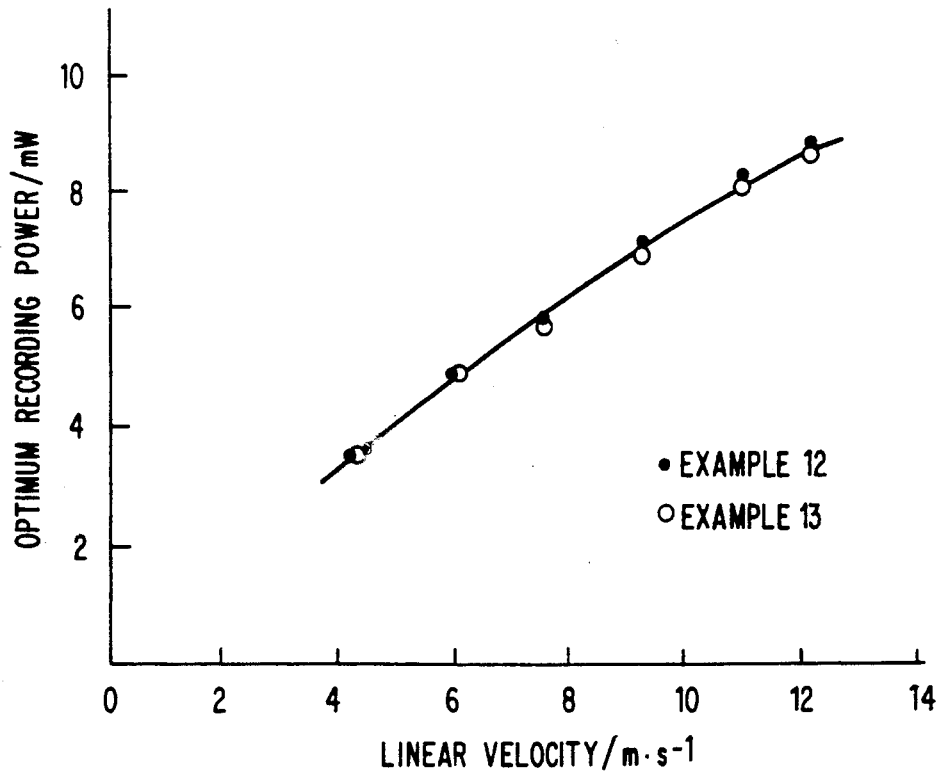
FIG. 4 is a graph depicting a relationship between linear velocity and optimum recording power in the magneto-optical recording media obtained in Examples 12 and 13.
Figure 5:
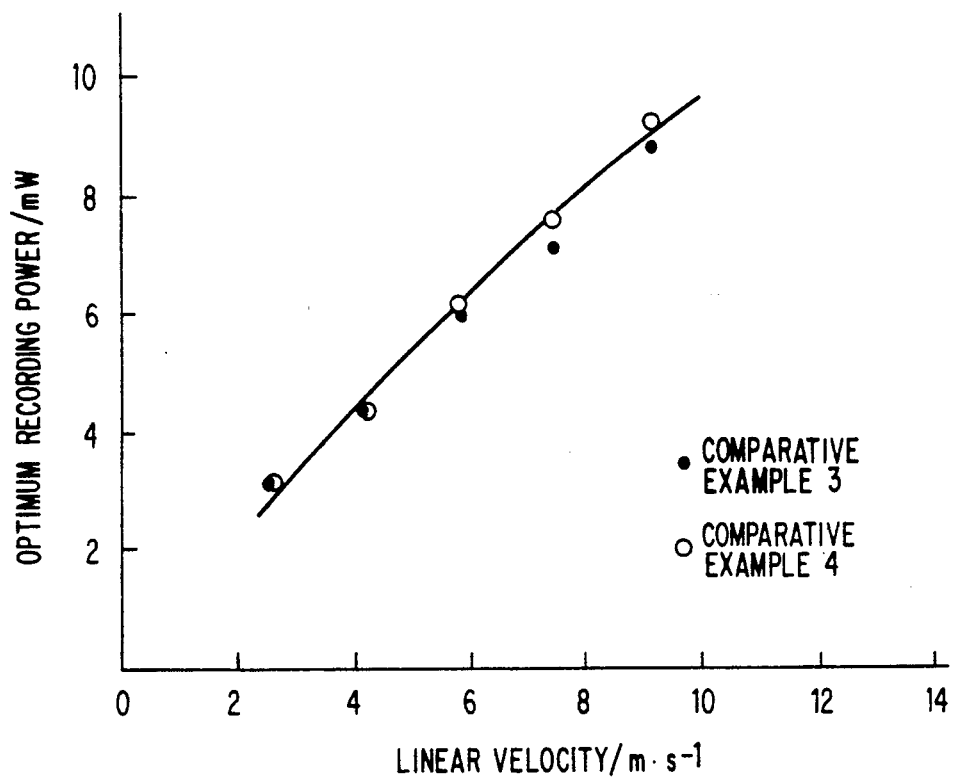
FIG. 5 is a graph depicting a relationship between linear velocity and optimum recording power in the magneto-optical recording media obtained in Comparative Examples 3 and 4.

The results of Examples 10 and 11 are shown in FIG. 3; Examples 12 and 13 in FIG. 4; and Comparative Exampels 3 and 4 in FIG. 5, respectively. It can be seen from these results that the medium of the present invention is excellent in recording sensitivity.

Evaluation Test 2

Each of the recording media obtained in Examples 10 to 13 and Comparative Examples 3 and 4 was maintained at a temperature of 65° C and at a relative humidity of 90%, and the changes of appearance and reflectance with time were observed.

Figure 6:
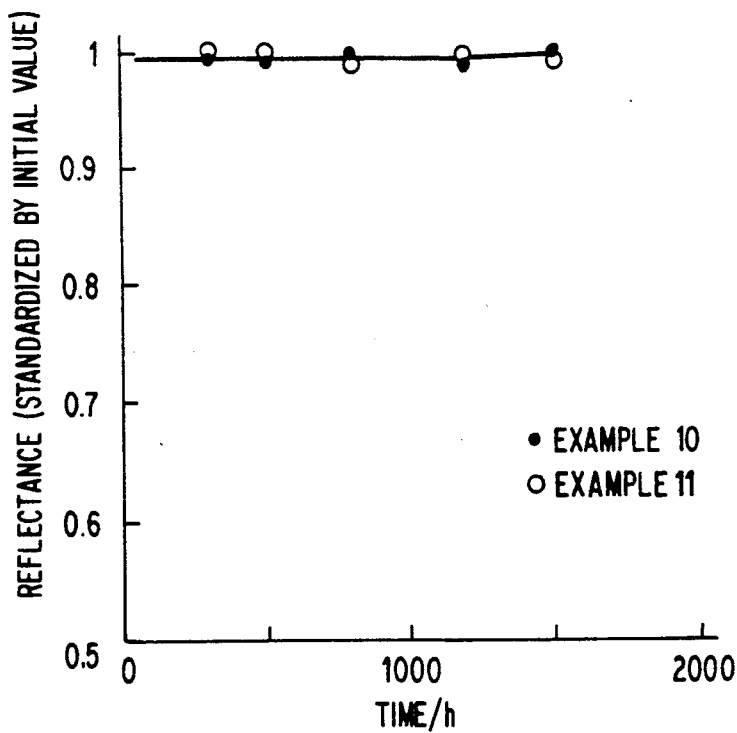
FIG. 6 is a graph showing changes of reflectance with time of the magneto-optical recording media obtained in Examples 10 and 11.
Figure 7:
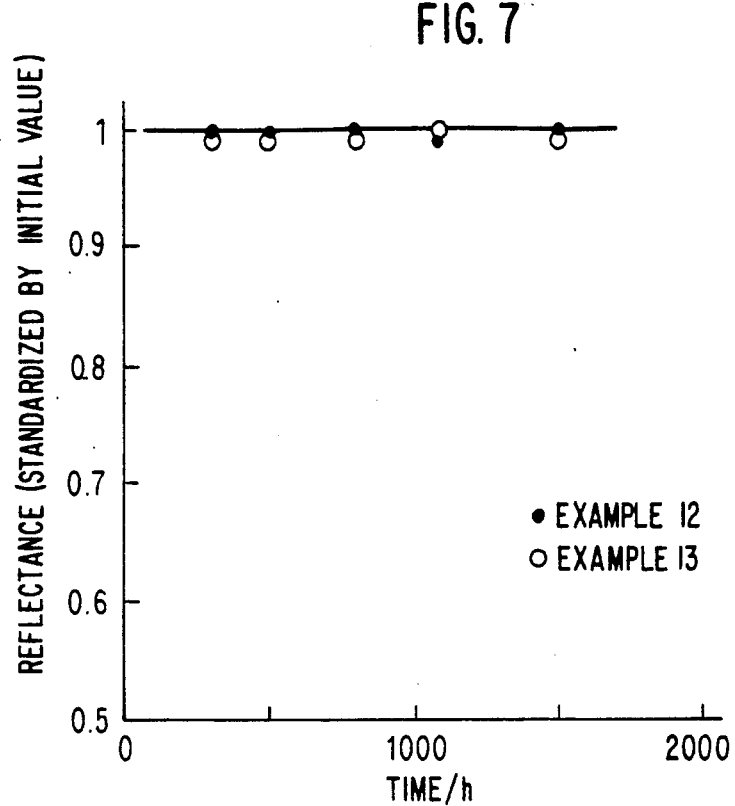
FIG. 7 is a graph showing changes of reflectance with time of the magneto-optical recording media obtained in Examples 12 and 13.
Figure 8:
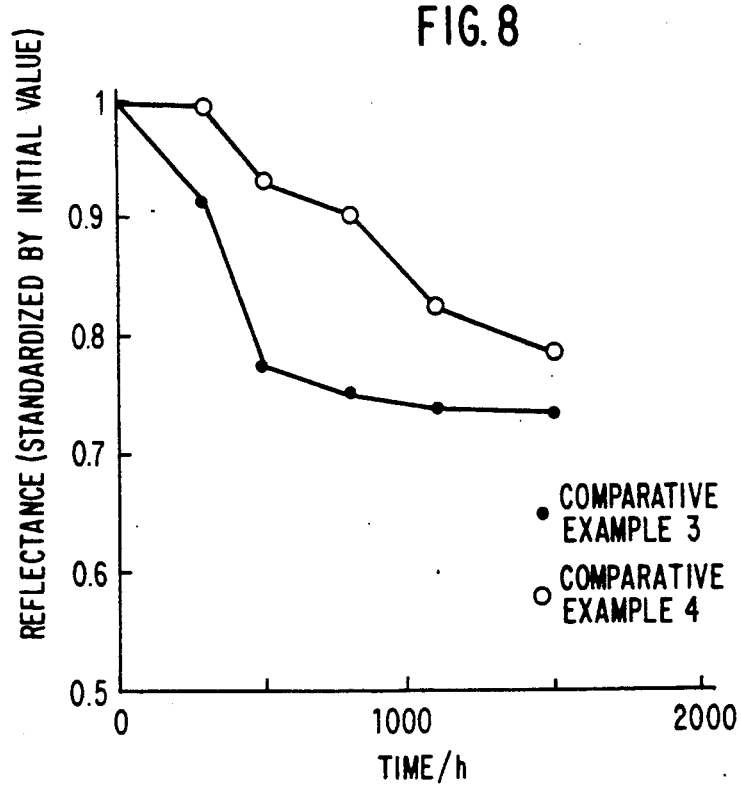
FIG. 8 is a graph showing changes of reflectance with time of the magneto-optical recording media obtained in Comparative Examples 3 and 4.

The changes of reflectance (standardized by the initial value) in Examples 10 and 11 are shown in FIG. 6; those in Examples 12 and 13 are shown in FIG. 7; and those in Comparative Examples 3 and 4 are shown in FIG. 8. The recording media of Comparative Examples 3 and 4 suffered from cracking and reduction in reflectance in 400 to 500 hours. To the contrary, the recording media of Examples 10 to 13 suffered from neither cracking nor pitting and underwent substantially no change in reflectance even when maintained for 1500 hours, proving excellent reliability. The freedom from pitting and reduction in reflectance also prove excellent properties for blocking moisture and oxygen.

The difference in durability between the magneto-optical recording media according to the present invention in which a coating film containing Si, N, and H is employed and the comparative magneto-optical recording media is believed to reside in that the film containing Si, N, and H has improved affinity for the polycarbonate substrate owing to the presence of H to thereby exhibit improved adhesion to the substrate. Further, Si and N are partially bonded to H to provide a film having improved softness and a reduced stress, which, in combination with the improved adhesion, makes the film freed from cracks or peeling off.

Evaluation Test 3

Each of the recording media of Examples 12 and 13 and Comparative Examples 3 to 5 was evaluated for reproduction characteristics by using the same drive apparatus as used in the foregoing tests. Conditions for measurements were 4 m/s in linear velocity, 500 Oe in external magnetic field; 1 MHz in recording frequency; 50% in duty ratio; and 0.8 mW in reading power. Recording was conducted with a recording power being varied within a range of from 3 mW to 8 mW at 0.2 mW intervals, and the C/N ratio at the point where the second harmonic became the minimum was obtained. The results are shown in Table 4 below.

TABLE 4

| Example No. | C/N Ratio (dB) |
|---|---|
| Example 12 | 54.7 |
| Example 13 | 54.6 |
| Comparative Example 3 | 54.2 |
| Comparative Example 4 | 54.5 |
| Comparative Example 5 | 50.5 |

It can be seen from the results of Table 4 that any of the recording media obtained in Examples 12 and 13 and Comparative Examples 3 and 4 has a higher C/N ratio by 4 to 5 dB than the medium of Comaprarative Example 5 which has no coating film for Kerr effect enhancement. Accordingly, the protective film according to the present invention has a sufficient function of Kerr effect enhancement.

As described above, the magneto-optical recording medium in accordance with the present invention, in which at least one coating film is provided for protection of a magnetic film and/or Kerr effect enhancement, has high reliability, excellent read-out performance properties, and high recording sensitivity while exhibiting high magneto-optical effects and freedom from corrosion of the magnetic film.

While the invention has been described in detail and with reference to specific embodiment thereof, it will be apparent to one skilled in the art that various changes and modifications can be made therein without departing from the spirit and scope thereof.

What is claimed is:

1. A magneto-optical recording medium comprising a substrate having thereon a magneto-optical recording film and at least one coating film provided on a light incident side and/or an opposite side thereto of said magneto-optical recording film, wherein said coating film consists essentially of silicon, nitrogen, and hydrogen as constituent elements, wherein said coating film contains from $1.0 \times 10^{21}$ to $1.0 \times 10^{23}$ hydrogen atoms per $cm^3$, wherein said coating film has a refractive index of 19–2.4, and wherein said coating film has a nitrogen content of at least 10 atomic % based on the sum of the constituent elements other than hydrogen.

2. A process for producing a magneto-optical recording medium comprising a substrate having thereon a magneto-optical recording film and at least one coating film provided on a light incident side and/or an opposite side thereto, of said magneto-optical recording film, which comprises forming a coating film containing silicon, nitrogen, and hydrogen as constituent elements by sputtering using metallic silicon as a target in a mixed gas comprising an inert gas and ammonia gas.

3. A process for producing a magneto-optical recording medium comprising a substrate having thereon a magneto-optical recording film and at least one coating film provided on a light incident side and/or an opposite side thereto, of said magneto-optical recording film, which comprises forming a coating film containing silicon, nitrogen, and hydrogen as constituent elements by sputtering using metallic silicon as a target in a mixed gas comprising an inert gas, ammonia gas, and hydrogen gas.

4. A process for producing a magneto-optical recording medium comprising a substrate having thereon a magneto-optical recording film and at least one coating film provided on a light incident side and/or an opposite side thereto, of said magneto-optical recording film, which comprises forming a coating film containing silicon, nitrogen, and hydrogen as constituent elements by sputtering using metallic silicon as a target in a mixed gas comprising an inert gas, nitrogen gas, and ammonia gas.

* * * * *